United States Patent [19]

Hoffmann

[11] Patent Number: 4,989,321
[45] Date of Patent: Feb. 5, 1991

[54] ROTATABLY DRIVEN CUTTERHEAD FOR A VEGETATION CUTTING APPARATUS

[75] Inventor: Joachim Hoffmann, Aichwald, Fed. Rep. of Germany

[73] Assignee: Andreas Stihl, Waiblingen, Fed. Rep. of Germany

[21] Appl. No.: 541,951

[22] Filed: Jun. 22, 1990

[30] Foreign Application Priority Data

Jul. 7, 1989 [DE] Fed. Rep. of Germany ....... 3922339

[51] Int. Cl.$^5$ ................................................. B26B 7/00
[52] U.S. Cl. .......................................... 30/276; 30/347
[58] Field of Search .................... 30/276, 347; 56/12.5, 56/12.7

[56] References Cited

U.S. PATENT DOCUMENTS

| | | | |
|---|---|---|---|
| 4,607,431 | 8/1986 | Gay | 30/276 |
| 4,651,421 | 3/1987 | Zerrer | 30/276 |
| 4,866,846 | 9/1989 | Hoffman et al. | 30/276 |
| 4,897,923 | 2/1990 | Collins | 30/276 |

FOREIGN PATENT DOCUMENTS 2855990 7/1980 Fed. Rep. of Germany .

Primary Examiner—Douglas D. Watts
Attorney, Agent, or Firm—Walter Ottesen

[57] ABSTRACT

The invention relates to a rotatably driven cutterhead for a vegetation cutter apparatus. The cutterhead includes a housing in which a spool for the cutting filament is rotatably journalled so as to be rotatable relative to the housing. Switching stops are provided which coact with the spool. Latching levers are pivotally mounted in the housing which each have a latching arm which coacts with the switching stops in dependence upon centrifugal force in such a manner that the spool is first in a latched condition and is then in a freely rotatably condition with correspondingly higher centrifugal force. A predetermined length of filament is unwound in the freely rotatably condition of the spool. The latching arm pivots between an outer release position and an inner latching position and is resiliently biased by a spring in the direction of its latching position. A curved guideway is provided for positively guiding the latching arm out of its outer release position into its inner latching position in which the latching lever coacts with inner latching cams to hold the spool in its latched condition. The curved guideway extends inwardly with respect to the drive axis for positively guiding the latching lever from the release position into the latching position. This assures a reliable automatic switching which requires no intervention by the operator such as supplying additional fuel to the engine or otherwise.

8 Claims, 2 Drawing Sheets

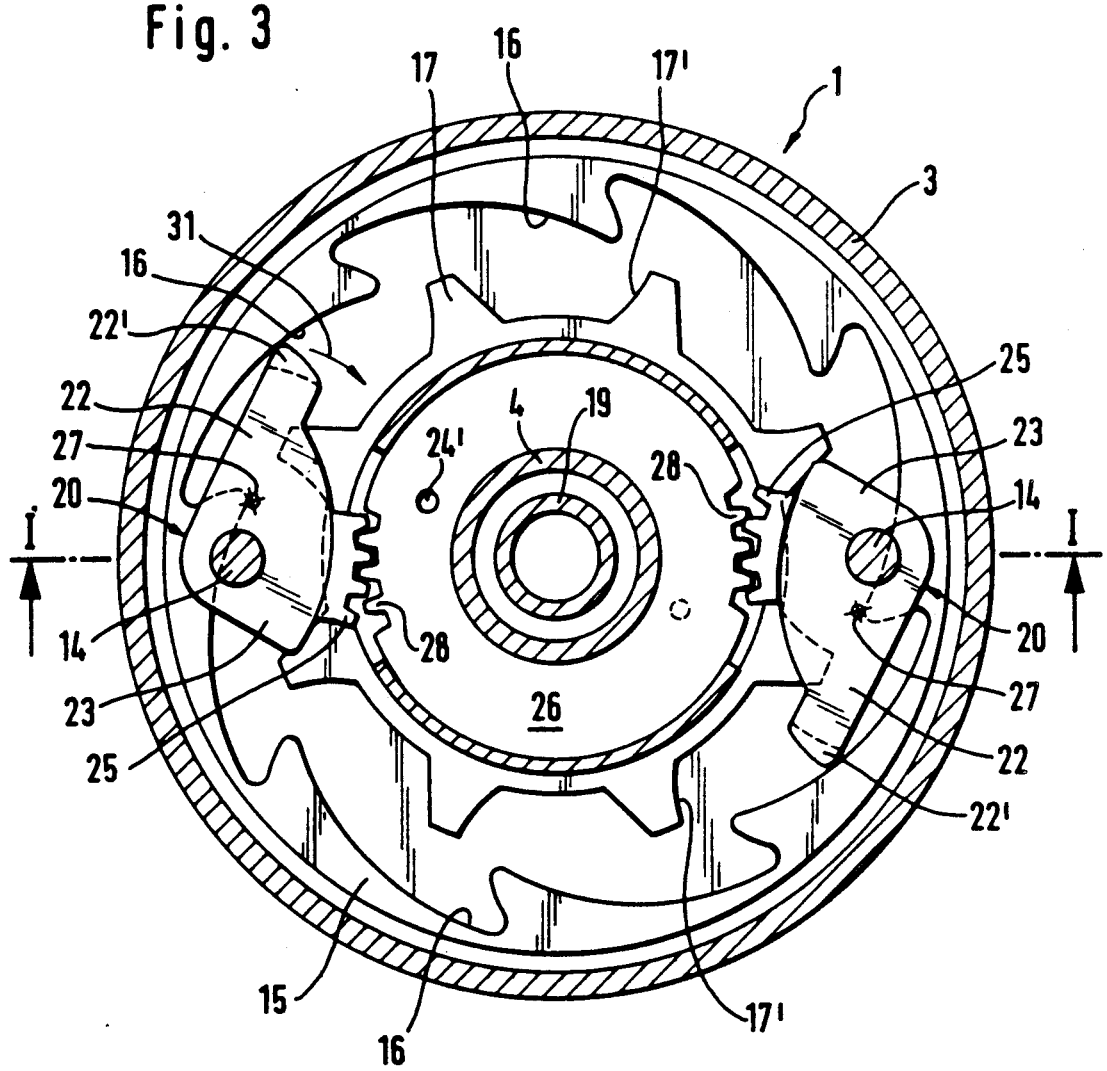

ROTATABLY DRIVEN CUTTERHEAD FOR A VEGETATION CUTTING APPARATUS

FIELD OF THE INVENTION

The invention relates to a rotatably driven cutterhead for vegetation cutter apparatus and includes a housing and a spool on which a cutting filament is wound. The spool is rotatably mounted on a hub of the housing and coacts with switching stops arranged in the housing.

BACKGROUND OF THE INVENTION

A cutterhead is disclosed in published German patent application 2,855,990 wherein the flexible cutting filament is automatically readjusted by a predetermined length by means of a pivotally mounted latching lever which releases the spool. The cutting filament is usually a plastic filament which wears down during the cutting operation and becomes shorter. The automatic readjustment of the filament takes place in that the rotational speed of the cutterhead and therefore its centrifugal force acting on the latching lever increases as the projecting segment of the cutting filament becomes ever shorter. This centrifugal force moves the latching lever against the biasing force of a spring into an outer release position wherein the latching lever releases a latch stop of the spool so that the spool can rotate relative to the cutterhead and thereby unwind a segment of filament.

As the filament unwinds, the resistance becomes greater and the rotational speed becomes less so that the spring force acting on the latching lever again returns the latching lever to its initial position in which a latch cam of the latching lever engages in a corresponding latching recess and latches the spool.

A disadvantage of this configuration is that there is no precise return of the latching lever to its position wherein the spool is latched and the return takes place essentially through a spring force in dependence upon centrifugal force.

It is a further disadvantage of this configuration that the latching cams provided in the recesses lie in the peripheral region of the spool hub. Accordingly, the latching cams are on a relatively small peripheral region and therefore little space is provided for the configuration of the latching lever and especially for the latching cams. This leads to high contact pressures in the latched position which, in turn, lead to an increased wear and a premature exhaustion of the cutterhead.

U.S. Pat. No. 4,607,431 discloses a cutterhead wherein a supply spool for the cutting filament is rotatably mounted in the housing of the cutterhead and is likewise provided with a latching arrangement. This latching arrangement includes a one-arm latching lever pivotally journalled in the housing and a switching arm which coacts with switching stops of a switching disc. The switching stops are provided over the periphery of the spool and the latching lever coacts with the switching disc in such a manner that when the cutting filament is worn, the latching lever transfers out of its latching position with respect to the switching stops of the spool and into an outer position in which the latch on the spool is removed. A basic difference however is that with this arrangement, the filament pulled from the spool is guided around the pivotable latching lever such that a filament redirecting structure is formed directly on the latching lever. The filament redirecting structure defines a point of application for the centripetal force since the rotating cutting filament is subjected to centrifugal force which has a varying magnitude in dependence upon the rotational speed. The centripetal force is directed opposite to the centrifugal force acting on the latching lever and tends to move the latching lever inwardly into its latched position. Accordingly, in the cutterhead described in U.S. Pat. No. 4,607,431, the cutterhead only responds to the mass of the free end of the filament which, in turn, is a direct function of its length. On the other hand, the cutterhead disclosed in published German patent application 2,855,990 includes a latching lever which is not subjected to the centrifugal force of the cutting filament. A disadvantage of this configuration is that an automatic readjustment is not assured for an intense wear of the cutting filament. Accordingly, the operator must make the readjustment manually especially when there is a great amount of wear and the exposed filament segment is very short. This readjustment is made for example by controlling the throttle of the engine of the vegetation cutter. In this configuration, the cutting filament is not biased with adequately large return forces which are intended to transfer the latching lever from the release position into the latching position. This is true even when the one-arm latching lever is guided in a slot in the manner of a rocker arm with the rocker arm having center segments and straight line guide path segments extending therefrom between adjacent latch positions.

U.S. Pat. No. 4,651,421 discloses a cutterhead having a two-arm latching lever which is not biased by the cutting filament; that is, the latching lever is not subjected to the centrifugal force of the cutting filament as in the cutterhead described in published German patent application 2,855,990. In this configuration, the latching lever coacts with individual stop cams arranged on the spool so that the latching lever biased by the force of the return spring reaches an outer release position for the spool when the centrifugal force working thereon is greater than the returning spring force.

In the embodiment of U.S. Pat. No. 4,651,421, two latching levers are arranged symmetrical to each other and are in meshing engagement with the spool via an intermediate ring in such a manner that the switching operations take place synchronously. As in the configuration first described herein, the disadvantage is here also present that there is no precise return of the latching levers notwithstanding the synchronous action and manual intervention is required by the operator.

SUMMARY OF THE INVENTION

It is an object of the invention to provide a cutterhead wherein the latching lever is continuously biased with a spring force in the direction of its latching position and wherein this latching lever can be transferred into its latching position in every operational position independently of other influences. It is another object of the invention to provide such a cutterhead wherein there is a completely automatic filament readjustment without any intervention on the part of the operator, for example, by means of changes in motor speed.

The cutterhead of the invention is for a rotatably-driven vegetation cutter apparatus defining a drive axis about which the cutterhead is rotatably driven. The cutterhead includes: a housing adapted to be rotatively driven by the vegetation cutter apparatus about the axis; the housing having a hub formed thereon so as to extend along the axis; a spool rotatably journalled on the hub for carrying a flexible cutting filament wound thereon;

indexing means for permitting an incremental rotation of the spool relative to the housing to pay out incremental lengths of the cutting filament, the indexing means including: a plurality of cams connected to the spool so as to be rotatable therewith; a latching lever having a latching arm and being pivotally journalled in the housing so as to be pivotally movable between a radially inner latching position wherein the latching arm is in contact engagement with one of the cams so as to prevent a rotational movement of the spool with respect to the housing and a radially outer release position into which the lever is moved in dependence on centrifugal force to release the spool for movement relative to the housing to pay out an incremental length of the filament; resilient biasing means for applying a biasing force to the latching lever sufficient to move the latching lever into the latching position after the incremental length of filament has been payed out; and, guideway means defining a curved guideway extending inwardly with respect to the drive axis for positively guiding the latching lever from the release position into the latching position.

The latching arm of the pivotable latching lever is guided out of its outer release position back into the inner latching position wherein the spool is latched by an uninterrupted curved guideway which runs toward the inside of the cutterhead and is continuous without jumps or straight line segments. Because of this configuration, the return movement is free of outside influences such as wear, spring tolerances and spring fatigue so that an automatic and precise return of the spool from the released condition into the latched condition is assured. At the same time, an accurate predetermined length of the filament is always released so that optimal constant relationships are present with respect to rotational speed and cutting performance.

Furthermore, the invention makes it possible to provide an embodiment of the cutterhead wherein the individual curved guideways lying one behind the other in the peripheral direction can be positioned so that they lie outwardly very far up to the vicinity of the inner wall of the housing so that they can be configured to be adequately long and can therefore be optimally configured with respect to their arcuate shape and length in accordance with other parameters of the cutterhead. In this way, a continuous and jump-free contact engagement during the return movement of the latching arm of the latching lever assigned to the curved guideway is assured. At the same time, the stop face of the latching lever as well as the counter face of the inner latching cam corresponding to the spool can be configured so as to have adequate size. A low contact pressure producing greatly reduced wear in the latching position is obtained because of the large surface contact between the two faces defined by the latching lever and the inner latching cam, respectively.

The arrangement of the invention is suitable for an embodiment having only one latching lever as well as for an embodiment having two or more latching levers with these latching levers being arranged rotationally symmetrically with respect to each other. Furthermore, the embodiment according to the invention is especially suited for a synchronous drive when a plurality of latching levers is provided.

The curved guideway is advantageously so configured that it runs eccentrically to the rotational axis of the cutterhead and is free of curved segments extending centrically to the rotational axis. In this way, an especially soft and uniform return guidance of the latching lever into its latching position is obtained.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
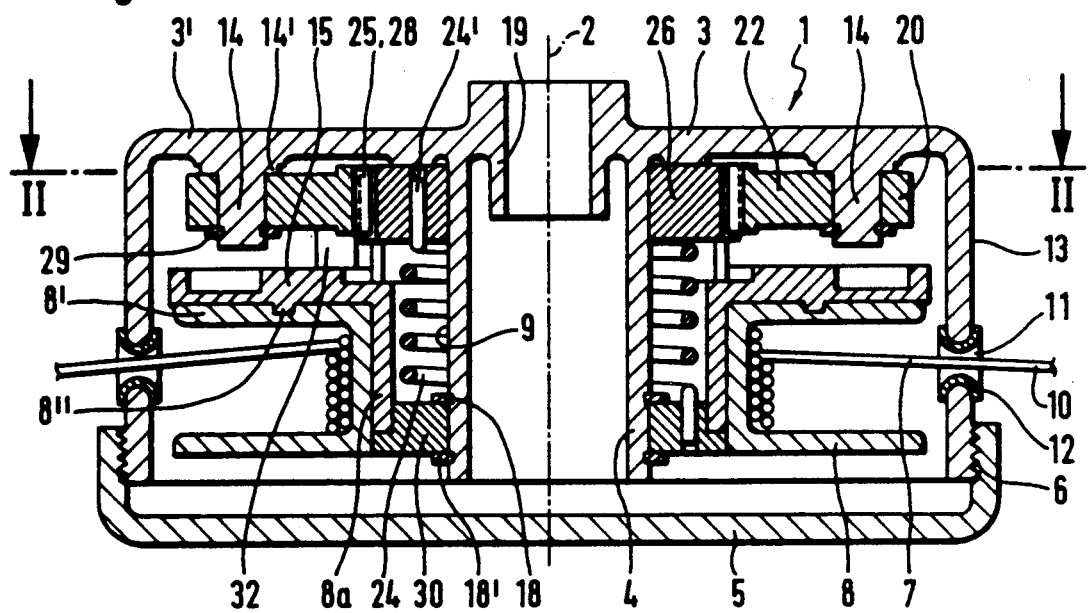
FIG. 1 is an axial section view of an embodiment of the cutterhead of the invention taken along line I—I of FIGS. 2 or 3.

The cutterhead 1 shown in the drawing is part of a vegetation cutter apparatus (not shown) which is used for cutting grass and the like. The cutterhead is driven by a motor of the vegetation cutter apparatus and rotates about the rotational axis 2 shown in FIG. 1. The cutterhead 1 has a housing 3 having a pot-like shape with a base wall 3' disposed at the drive end as well as a receptacle 19 for the motor shaft and a hub 4. A cover 5 seated on the cylindrical peripheral wall 13 of the housing 3 lies opposite the base wall 3'. The cover 5 is attached to the peripheral wall 13 of the housing 3 by means of a screw thread 6 in the embodiment shown.

In the housing 3, a spool 8 is coaxial to the drive axis 2 and is rotatably journalled on the peripheral surface 9 of the hub 4 so that the spool 8 can rotate relative to the housing in a released condition. A cutting filament 7 such as a plastic filament is wound on the spool 8. The portion of the filament 7 unwound from the spool is guided through an opening 11 in the housing 3 with this opening 11 being surrounded by a bushing 12 guiding the filament as it passes through the peripheral wall of the housing.

In the embodiment shown, pivot lugs 14 are provided on the base wall 3' of the housing 3 lying opposite the cover 5 so as to extend into the housing. A latching lever 20 is journalled on each of the pivot lugs 14. Each of the latching levers 20 defines a centrifugal force-dependent coupling member between the spool 8 and the housing 3. In the embodiment shown, two pivot lugs 14 having respective latching levers 20 are provided. Embodiments having more than two latching levers are possible and should be arranged rotationally symmetrically to obtain a balance of masses.

An embodiment having only a single latching lever is possible with a corresponding mass compensation to prevent unwanted imbalances. One or more latching levers are advantageously positioned so as to lie against a widened shoulder 14' of the pivot lug 14 with each latching lever 20 being held by a circlip 29.

One or two cutting filaments can be wound on the spool 8. The spool 8 has a switching disc 15 having a plurality of evenly spaced latching cams 17 and a plurality of outer curved guideways 16 distributed uniformly over the periphery. The spool 8 has an upper flange 8' facing toward the base wall 3' and the drive. The switching disc 15 is loosely connected with the upper flange 8' of the spool 8 in the axial direction so that the spool 8 can be removed for exchanging the filament without taking out the switching disc 15. The switching disc 15 is however connected to the spool 8 in a form-tight manner by means of the lugs 8" shown in FIG. 1 such that the switching disc 15 is taken along by the spool in the rotational direction. The switching disc includes a cylindrical projection 8a for reliably guiding and journalling the switching disc. The cylindrical projection 8a is seated on a bearing ring 30 and has an outer cylindrical peripheral surface for receiving the cylindrical section of the spool 8. The bearing ring 30 is advantageously held on the hub 4 by circlips (18, 18').

Latching levers 20 are pivotally journalled on the pivot lugs 14 fixed to the housing. The latching levers 20 are subjected to the centrifugal force acting thereon during rotation of the cutterhead and undergo a back and forth pivotal movement in dependence upon the magnitude of the centrifugal force in the direction of arrow 31 (see FIG. 2). The latching lever 20 has a first latching arm 22 having a stop face 22'. This stop face 22' lies against a corresponding counter face of the corresponding inner latching cam 17 in the latched position of the spool and in this way prevents the rotation of the spool as shown in FIG. 2 wherein the latching lever 20 is in the latching position.

The second arm 23 of the latching lever 20 is advantageously provided with interlocking means in the form of teeth 25 which mesh in corresponding teeth 28 provided on the intermediate ring 26. The intermediate ring 26 is advantageously journalled on the peripheral surface 9 of the hub 4 beneath the base wall 3'. The movements of the latching levers 20 are transmitted directly to the intermediate ring 26 via the interlocking connection defined by teeth (25, 28) whereby a synchronous movement of the latching levers 20 and therefore a precise switching of both latching levers is provided. The intermediate ring 26 is subjected to the force of the helical spring 24 surrounding the hub 4. The spring 24 has a leg 24' which engages in a bore of the intermediate ring 26. In this way, the spring biases the intermediate ring and, by means of the meshing engagement (25, 28), the latching levers. The centers of gravity of the latching levers 20 preferably lie eccentrically with respect to the axial center of the pivot lug 14 in the region of the latching arm 22.

Curved guideways 16 are provided on the switching disc 15 so as to be positioned radially outwardly and are associated with the inner ring of latching cams 17 having counter faces 17'. The curved guideways 16 are associated with the latching cam 17 in such a manner that when a predetermined centrifugal force is exceeded, the latching lever 20 with its latching arm 22 (see FIG. 2) moves out of the latching position (in which the stop face 22' of the latching arm 22 lies in contact engagement with the counter face 17' of the latching cam 17) outwardly in the direction of arrow 31 and unlatches the switching disc 15 and therefore the spool 8 so that a segment of the wound filament 7 can unwind. As soon as the cutting filament 7 has been released for unwinding, the length of the cutting segment 10 of the filament 7 is increased and therefore the cutting resistance acting on this cutting segment of the filament 7 is also increased. When the released filament segment has reached its predetermined length, the cutting resistance is so great that the rotational speed of the cutterhead drops and the filament force acting on the filament via spool 8, the switching disc 15 and the latching lever 20 acts with the force of the return spring 24 applied to the latching lever 20 to return the latching lever into its latching position shown in FIG. 2. The latching lever 20 and the switching disc 15 are interlocked with each other via a lug-like catch 32 provided at the lower side of the latching lever 20 so that movements and forces which act on the latching lever and on the spool are transmitted to the latching lever during its return into the latching position. On the other hand, forces acting on the filament are transmitted to the latching lever in its latched position.

Figure 2:
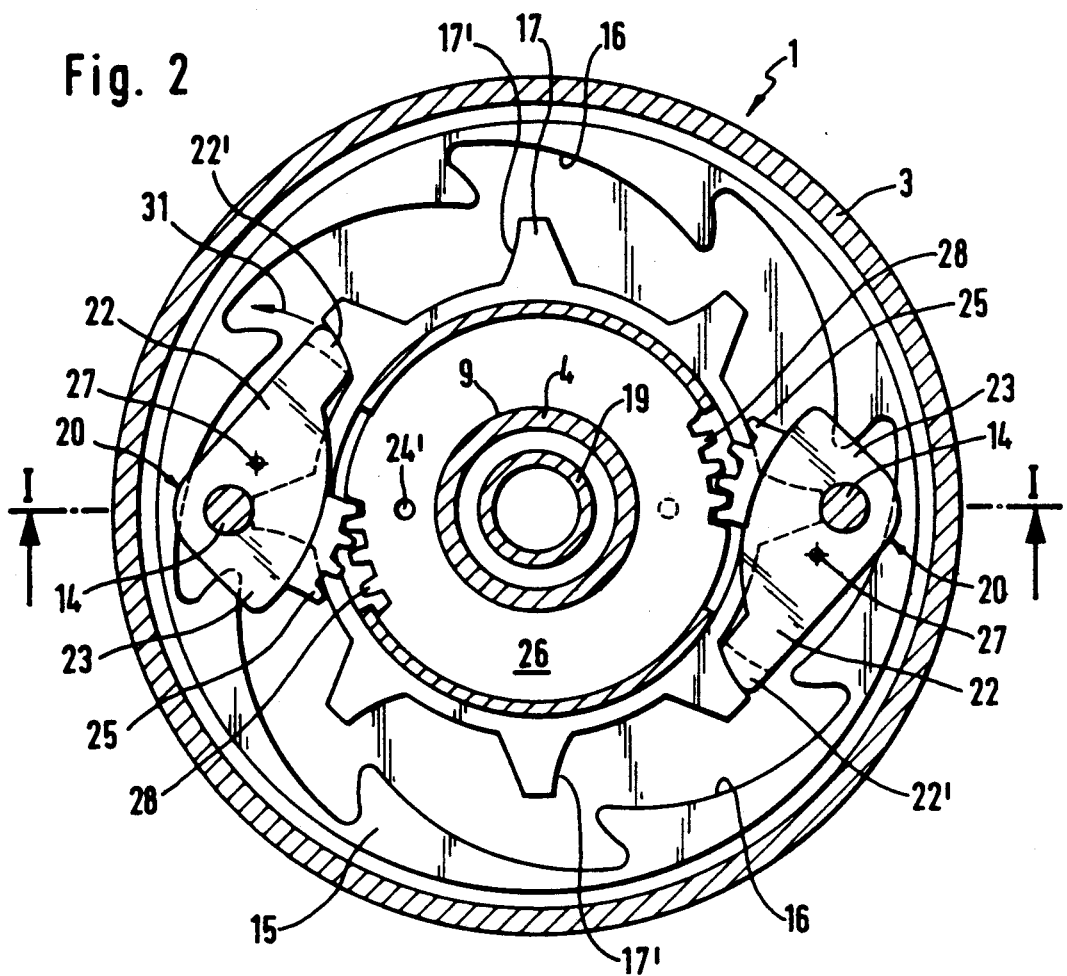
FIG. 2 is a section view taken along line II—II of FIG. 1 perpendicular to the rotational axis of the cutterhead with the latching levers shown in the latching position wherein the spool is latched; and, FIG. 3 is the same section view as in FIG. 2 but with the latching levers shown in the release position from which they are guided back to their latching position.

The latching lever returns from its released position shown in FIG. 3 to its latching position shown in FIG. 2 after the rotational speed drops causing a reduced centrifugal force to act on the latching lever. Return forces act on the switching disc as a consequence of the application of centrifugal force by the cutting filament 7 and act together with the returning force of the spring 24 on the latching arm 22 to positively guide the switching arm 22 from its outer released position along the course of the guideway 16 into the latching position at the inner latching cam 17 blocking the release of the filament. The curved guideway 16 is arranged eccentrically with respect to the rotational axis of the cutterhead and is free of curved segments which extend centrically to the rotational axis 2 in order that the return of the latching lever is gentle and free of jumps and without any interruption. The curved guideway 16 is then free of straight line segments or unevenness such as jumps and the like and therefore extends in a single uninterrupted arc from the outer release position of the latching lever 20 to the inner latching position thereof. The curved guideways 16 are so arranged in the peripheral direction one behind the other that they almost join each other directly so that the return of the latching lever 20 from the outer release position inwardly takes place without significant interruption. The positive guidance of the latching lever 20 by means of the curved guideway 16 makes it also possible to hold the contact pressure between the cam counter face 17' of the inner latching cam 17 and the movable stop face 22' of the latching lever 22 to a low value in that these surfaces are configured so as to be optimally large such that the effective forces are distributed over the largest possible contact engaging surfaces.

The positive guiding via the curved guideway 16 assures that completely automatic precise switching operations are initiated without any intervention of the operator because the latching lever 20 is positively pressed back into the inner latching position because of the filament force acting on the switching disc in combination with the return force of the spring 24. The latching lever cannot hang up at an intermediate position for example when the filament has not been resupplied to a sufficient extent and, on the other hand, when the return force of the spring is not sufficient to effect a return movement to the latching position.

Improper handling by the operator such as by supplying excessive fuel to the engine no longer results in an unwanted increase in rotational speed and no longer prevents a return to the latched position as in known embodiments which made intervention by the operator necessary in such instances in order to readjust the filament. The switching disc 15 applies an additional return torque to the latching lever 20. For this reason it is assured for all operating conditions that the latching lever is again returned from the release position even when the filament is relatively short. The return guiding movement takes place even for very short filament lengths and high rotational speeds because, as mentioned, the return force from the switching disc becomes effective in addition to the force of the return spring 24. Accordingly, it is no longer necessary for the operator to intervene in the operation for extending the filament length as with the known apparatus.

In known apparatus, the latching lever is charged directly by the cutting filament. In contrast to this known apparatus, the invention provides the advantage that the rotation of the latching levers from the inner latching position to the outer release position is entirely independent of the centrifugal force acting on the filament at the particular time. Accordingly, a reliable return of the latching levers takes place by appropriately matching the return spring 24, the latching lever 20 and the curved guideway 16. This reliable return of the latching lever takes place even independently of whether the cutterhead is equipped with one or more filaments.

It is understood that the foregoing description is that of the preferred embodiments of the invention and that various changes and modifications may be made thereto without departing from the spirit and scope of the invention as defined in the appended claims.

What is claimed is:

1. A cutterhead for a rotatably-driven vegetation cutter apparatus defining a drive axis about which the cutterhead is rotatably driven, the cutterhead comprising:
   a housing adapted to be rotatively driven by the vegetation cutter apparatus about said axis;
   said housing having a hub formed thereon so as to extend along said axis;
   a spool rotatably journalled on said hub for carrying a flexible cutting filament wound thereon;
   indexing means for permitting an incremental rotation of said spool relative to said housing to pay out incremental lengths of the cutting filament, said indexing means including:
   a plurality of cams connected to said spool so as to be rotatable therewith;
   a latching lever having a latching arm and being pivotally journalled in said housing so as to be pivotally movable between a radially inner latching position wherein said latching arm is in contact engagement with one of said cams so as to prevent a rotational movement of said spool with respect to said housing and a radially outer release position into which said lever is moved in dependence on centrifugal force to release said spool for movement relative to said housing to pay out an incremental length of the filament;
   resilient biasing means for applying a biasing force to said latching lever sufficient to move said latching lever into said latching position after the incremental length of filament has been payed out; and,
   guideway means defining a curved guideway extending inwardly with respect to said drive axis for positively guiding said latching lever from said release position into said latching position.

2. The cutterhead of claim 1, said curved guideway extending inwardly so as to lie eccentrically with respect to said drive axis so that no portion thereof lies centrically with respect to said drive axis.

3. The cutterhead of claim 1, said latching arm having a stop face formed thereon and each of said cams having a counter face formed thereon for coacting with said stop face when said latching lever is in said latching position.

4. The cutterhead of claim 1, further comprising a pivot lug for pivotally journalling said latching lever on said housing and said pivot lug defining a pivot axis; and, said latching lever having a center of gravity located in said latching arm and being disposed in spaced relationship to said pivot axis.

5. The cutterhead of claim 1, said latching lever being a first latching lever and said cutterhead further comprising:
   a second latching lever having a latching arm and being pivotally journalled in said housing so as to be pivotally movable between a radially inner latching position wherein said latching arm is in contact engagement with another one of said cams so as to prevent a rotational movement of said spool with respect to said housing and a radially outer release position into which said lever is moved in dependence on centrifugal force to release said spool for movement relative to said housing to pay out an incremental length of the filament;
   synchronous coupling means for coupling said latching levers together so as to be synchronously displaceable with each other; and,
   said resilient biasing means being a spring connected between said hub and said synchronous coupling means.

6. The cutterhead of claim 5, said synchronous coupling means comprising an annular body journalled on said hub so as to be freely rotatable with respect to the latter; and, interlocking means for interlocking said latching levers with said annular body whereby the displacement of one of said latching levers is synchronously transmitted to the other one of said latching levers.

7. The cutterhead of claim 6, said interlocking means comprising meshing teeth means formed on said annular member and said latching levers.

8. The cutterhead of claim 1, said guideway means comprising an annular structure for rotating with said spool and defining a peripheral edge; and, a plurality of uninterrupted arcuate segments interconnected around said structure in the direction of said peripheral edge; each of said arcuate segments extending eccentrically with respect to said drive axis in an uninterrupted curve so as to positively guide said latching lever from said release position back to said latching position.

* * * * *